(12) United States Patent
Liu et al.

(10) Patent No.: US 12,017,129 B2
(45) Date of Patent: Jun. 25, 2024

(54) VR OMNI-DIRECTIONAL EXERCISE MACHINE WITH TERRAIN ENVIRONMENT SIMULATION FUNCTION

(71) Applicant: Sicheng Liu, Nanjing (CN)

(72) Inventors: Sicheng Liu, Nanjing (CN); Peng Liu, Nanjing (CN); Yifu Du, Nanjing (CN)

(73) Assignee: Sicheng Liu, Nanjing (CN)

( * ) Notice: Subject to any disclaimer, the term of this patent is extended or adjusted under 35 U.S.C. 154(b) by 225 days.

(21) Appl. No.: 17/732,942

(22) Filed: Apr. 29, 2022

(65) Prior Publication Data

US 2023/0031046 A1 Feb. 2, 2023

(30) Foreign Application Priority Data

Jul. 29, 2021 (CN) .......................... 202110861584.1

(51) Int. Cl.
*A63B 71/00* (2006.01)
*A63B 71/06* (2006.01)

(52) U.S. Cl.
CPC ...... *A63B 71/0054* (2013.01); *A63B 71/0622* (2013.01); *A63B 2071/0072* (2013.01);
(Continued)

(58) Field of Classification Search
CPC ........ A63B 2071/0666; A63B 71/0054; A63B 2071/009; A63B 2071/0638; A63B 2024/0096; A63B 22/0015; A63B 22/20; A63B 71/0622; A63B 2071/0072; A63B 2071/0636; A63B 2220/51; A63B 2220/56; A63B 24/0087; A63B 22/0056; A63B 22/02; A63B 22/0271; A63B 22/18; A63B 2024/009; A63B 69/0035; G06F 2203/012; G06F 3/011; B65G 27/00; B65G 27/02; B65G 27/04; B65G 27/06; B65G 27/08;
(Continued)

(56) References Cited

U.S. PATENT DOCUMENTS

| 5,385,519 A * | 1/1995 | Hsu ..................... A63B 22/0023 482/902 |
| 6,516,934 B2 * | 2/2003 | Masciarelli, Jr. .... B65G 39/025 193/35 MD |

(Continued)

*Primary Examiner* — Megan Anderson
*Assistant Examiner* — Jonathan A Dicuia
(74) *Attorney, Agent, or Firm* — COZEN O'CONNOR

(57) ABSTRACT

A VR (virtual reality) omni-directional exercise machine with a terrain environment simulation function is provided. The VR omni-directional exercise machine includes a protective ring, a protective ring supporting rod, a protective ring supporting column, an exercise platform, a control machine, and VR head-mounted display, wherein the protective ring is arranged above the exercise platform and is connected to the protective ring supporting column through the protective ring supporting rod, and the bottom of the protective ring supporting column is fixedly connected to the outer side of the exercise platform; a moving vertical rod module lattice is arranged in the exercise platform, the moving vertical rod module lattice and the VR head-mounted display are both connected to the control machine, and the control machine is used to coordinate and control the movement of the moving vertical rod module lattice according to an terrain environment displayed in the VR head-mounted display.

4 Claims, 2 Drawing Sheets

(52) U.S. Cl.
CPC . *A63B 2071/009* (2013.01); *A63B 2071/0636* (2013.01); *A63B 2071/0638* (2013.01); *A63B 2071/0666* (2013.01); *A63B 2220/51* (2013.01); *A63B 2220/56* (2013.01)

(58) Field of Classification Search
CPC ........ B65G 27/10; B65G 27/12; B65G 27/14; B65G 27/16; B65G 27/18; B65G 27/20; B65G 27/22; B65G 27/24; B65G 27/26; B65G 27/28; B65G 27/30; B65G 27/32; B65G 27/34; B65G 35/00; B65G 35/0005; B65G 35/02; B65G 35/04; B65G 35/06; B65G 35/063; B65G 35/066; B65G 35/08; B65G 33/00; B65G 33/05; B65G 33/04; B65G 33/06; B65G 33/08; B65G 33/10; B65G 33/12; B65G 33/14; B65G 33/16; B65G 33/18; B65G 33/20; B65G 33/22; B65G 33/24; B65G 33/26; B65G 33/265; B65G 33/30; B65G 33/32; B65G 33/34; B65G 33/36; B65G 33/38

USPC ..................................... 482/121; 193/35 MD
See application file for complete search history.

(56) References Cited

U.S. PATENT DOCUMENTS

| | | | | |
|---|---|---|---|---|
| 7,004,895 | B2* | 2/2006 | Perry | A63B 26/003 |
| | | | | 482/146 |
| 7,780,573 | B1* | 8/2010 | Carmein | A63B 71/0622 |
| | | | | 482/4 |
| 10,192,454 | B2* | 1/2019 | Cakmak | A63B 24/00 |
| 11,008,175 | B1* | 5/2021 | Watts | F16M 13/02 |
| 11,383,062 | B2* | 7/2022 | Brodsky | A63B 22/02 |
| 2010/0083793 | A1* | 4/2010 | Ko | F16H 25/20 |
| | | | | 74/640 |
| 2012/0006237 | A1* | 1/2012 | Iguchi | F16C 29/046 |
| | | | | 384/15 |
| 2021/0354934 | A1* | 11/2021 | Aust | B65G 39/08 |

\* cited by examiner

VR OMNI-DIRECTIONAL EXERCISE MACHINE WITH TERRAIN ENVIRONMENT SIMULATION FUNCTION

CROSS REFERENCE TO RELATED APPLICATION

This patent application claims the benefit and priority of Chinese Patent Application No. 202110861584.1, filed on Jul. 29, 2021, the disclosure of which is incorporated by reference herein in its entirety as part of the present application.

TECHNICAL FIELD

The present disclosure relates to the technical field of virtual reality (VR) omni-directional machines, and in particular relates to a VR omni-directional exercise machine with a terrain environment simulation function.

BACKGROUND

Virtual reality (VR) refers to a technology that may combine a virtual environment with a real environment, or generate an entirely virtual environment. In theory, VR is a computer simulation system capable of creating a virtual world for a user to experience by generating a simulated environment using the computer, thus causing a user to immerse himself in the environment. VR is an electronic signal generated by utilizing data in real life through a computer technology, which is combined with various output devices to be converted into phenomena capable of being perceived by people. Such phenomena may represented as real objects as well as substances incapable of being seen by the naked eye, and are represented by a three-dimensional model. These phenomena are referred to as virtual reality because they are the real world simulated by the computer technology rather than what can be seen directly.

The VR technology has started to combine with the omni-directional treadmill technology in recent years, and the combination of the two has been used in the gaming field. People can immerse themselves in the VR world by combining the VR technology on the treadmill.

At present, the VR treadmill on the market can only mechanically complete some simple exercises and cannot simulate ground conditions of the virtual reality environment, leading to reduction of the sense of reality.

SUMMARY

For the problems in the prior art, a VR omni-directional exercise machine with a terrain environment simulation function is provided, through which a user can do exercises with high degree of difficulty, such as stair climbing, climbing and jumping, on a platform.

To achieve the objective, a technical solution as disclosed herein includes: a VR omni-directional exercise machine with a terrain environment simulation function comprises a protective ring, a protective ring supporting rod, a protective ring supporting column, an exercise platform, a control machine, and a VR head-mounted display, wherein the protective ring is arranged above the exercise platform and is connected to the protective ring supporting column through the protective ring supporting rod, and the bottom of the protective ring supporting column is fixedly connected to the outer side of the exercise platform; a moving vertical rod module lattice is arranged in the exercise platform, the moving vertical rod module lattice and the VR head-mounted display are both connected to the control machine, and the control machine is used to coordinate and control the exercise of the moving vertical rod module lattice according to an terrain environment displayed in the VR head-mounted display.

Further, the protective ring is provided with a rotating pulley and an inner protective net, the rotating pulley is embedded onto the protective ring, and the inner protective net is fixedly connected to a sidewall of the protective ring.

Further, a linear slide is arranged on a sidewall of the protective ring supporting column, a first pressure sensor is arranged on a contact face of the linear slide and the protective ring supporting column, and the linear slide is connected to the protective ring supporting rod.

Further, a force-controlled sensor and a damping inductor are arranged on the protective ring supporting rod, and the force-controlled sensor and the damping inductor are both connected to the control machine.

Further, each moving vertical rod module in the moving vertical rod module lattice comprises a small moving ball, an electromagnetic ring, a moving lead screw, a motor motion module, a movable sleeve, a supporting sleeve, a main control module and a battery module; the movable sleeve is nested in the supporting sleeve; the battery module, the main control module and the motor motion module are sequentially connected to the interior of the supporting sleeve from bottom to top, the moving lead screw is arranged in the movable sleeve and connected to the motor motion module, the electromagnetic ring is arranged above the movable sleeve, the small moving ball is embedded in the electromagnetic ring, and the electromagnetic ring is connected to the main control module.

Further, a second pressure sensor is arranged on the electromagnetic ring.

Compared to the prior art, the present disclosure has the following beneficial effects that: a moving vertical rod module lattice is arranged in the exercise platform, data of an exercise plane is latticed, and each moving vertical rod in the moving vertical rod module lattice can moves up and down, thus achieving the real experience of various exercise modes such as walking, running, jumping, stair climbing and the like in 360 degrees. A control machine is used to coordinate and control the moving vertical rod module lattice, the movement data of each moving vertical rod module is integrated, and each moving vertical rod module can be accurately controlled through a big data cloud computing technology to achieve terrain environment simulation, thus enabling a user to experience terrain changes on the VR omni-directional exercise machine. The VR omni-directional exercise machine solves the problem that an existing VR treadmill cannot simulate a ground environment, and can achieve a series of exercise modes such as walking, running, jumping, stair climbing and the like in 360 degrees on the premise of guaranteeing the exercise of the people. The VR omni-directional exercise machine provided by the present disclosure has the features of being safe, reliable, reasonable in structure, and high in science and technology feeling.

1 protective ring; 4 protective ring supporting rod; 5 linear slide; 6 protective ring supporting column; 7 exercise platform; 8 small moving ball; 9 electromagnetic ring; 10 moving lead screw; 11 motor motion module; 12 movable sleeve; 13 supporting sleeve; 14 main control module; 15 battery module; 16 moving vertical rod module lattice; 17 VR head-mounted display; 18 control machine; 20 first pressure sensor; 21 force-controlled sensor; 22 damping inductor; and 23 second pressure sensor.

DETAILED DESCRIPTION OF THE EMBODIMENTS

To further illustrate the technical solution and the working principle disclosed herein, the present disclosure is introduced in detail below with reference to the accompanying drawings and specific embodiments. The orientation descriptions used herein are those in conjunction with the drawings and can be understood by those skilled in the art.

Figure 1:
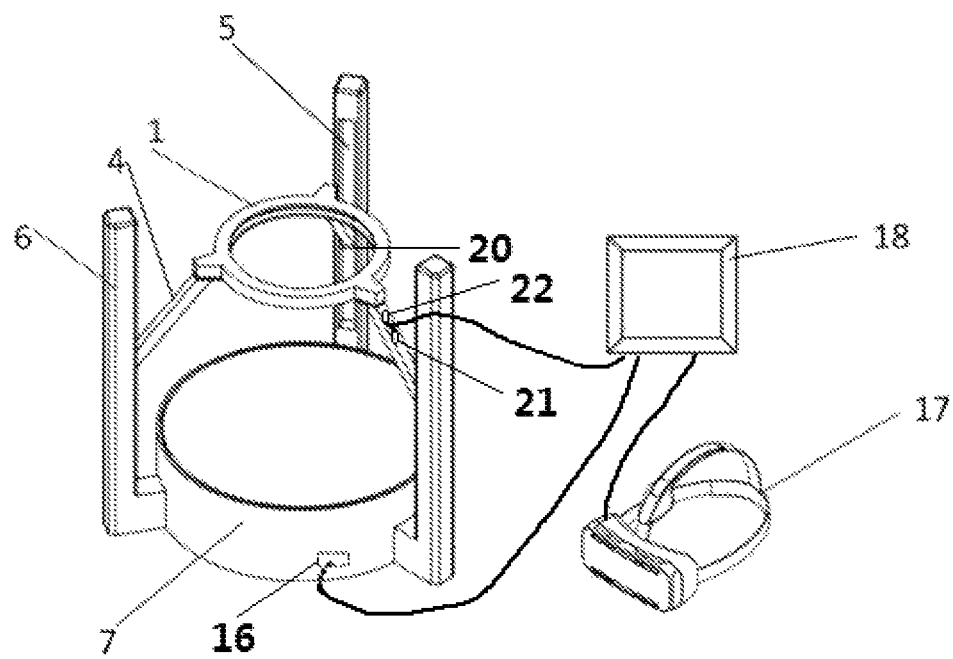
FIG. 1 is a structure diagram of a VR omni-directional exercise machine with a terrain environment simulation function of the present disclosure.
Figure 2:
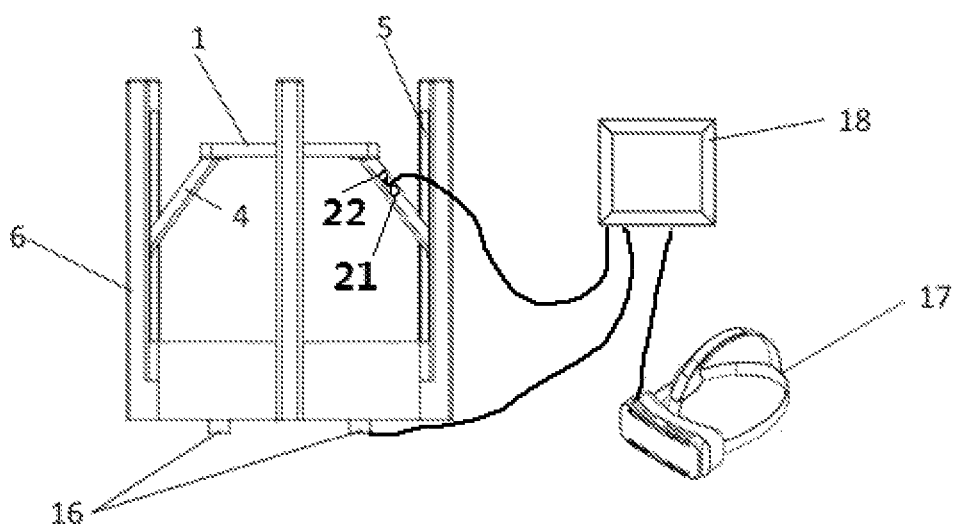
FIG. 2 is a front view of a VR omni-directional exercise machine with a terrain environment simulation function of the present disclosure.

FIGS. 1 and 2 show a structure diagram of a VR omni-directional exercise machine with a terrain environment simulation function of the present disclosure. The VR omni-directional exercise machine comprises a protective ring 1, protective ring supporting rods 4, protective ring supporting columns 6, an exercise platform 7, a control machine 18, and a VR head-mounted display 17. Protective ring 1 is arranged above the exercise platform 7, and is connected to the protective ring supporting columns 6 through the protective ring supporting rods 4. Protective ring 1 may follow a user while moving up and down along the protective ring supporting columns 6 that play a role in protecting and supporting, i.e., the bottoms of protective ring supporting columns 6 are fixedly connected to the outer side of the exercise platform 7. A moving vertical rod module lattice 16 is arranged in the exercise platform 7, and the moving vertical rod module lattice 16 and the VR head-mounted display 17 are both connected to control machine 18 which is used to coordinate and control the movement of the moving vertical rod module lattice 16 according to a terrain environment displayed in the VR head-mounted display 17, thus making the user feel the change of the terrain environment on the VR omni-directional exercise machine. Data of an exercise plane is latticed by arranging the moving vertical rod module lattice 16, and each moving vertical rod module in the moving vertical rod module lattice 16 can move up and down to provide an operable platform for various exercise modes such as walking, running, jumping, and stair climbing in 360 degrees, thus making the environment consistent with the body perception. The control machine 18 is used to coordinate and control the moving vertical rod module lattice 16 such that the movement data of various moving vertical rod modules are integrated, and each moving vertical rod module can be accurately controlled through a big data cloud computing technology. In this way, the terrain environment, even a complex terrain environment, can be simulated. A user wears the VR head-mounted display 17 in front of the user's eyes while exercising, the VR head-mounted display 17 is used to display an exercise environment that is more immersive. Moving vertical rod module lattice 16 may do corresponding movement according to the environment condition under different exercise environments.

The protective ring 1 is provided with a rotating pulley and an inner protective net. The rotating pulley is embedded onto the protective ring 1, and the inner protective net is fixedly connected to a sidewall of the protective ring 1. The user puts the protective ring 1 on the waist from top to bottom and fixes the protective ring through the inner protective net which is composed of an elastic net-shaped material and a safety belt and can relieve the pressing feeling of the protective ring 1 on a human body when the user moves. Due to the characteristics of being small in friction force, easy to slide, safe and reliable, the rotating pulley can achieve the 360-degree exercise function of the user, and the user actively exercises to drive the rotating pulley to move, thus completing the exercise of steering and angle-turning.

A linear slide 5 is arranged on a sidewall of protective ring supporting column 6, a first pressure sensor 20 is arranged on a contact face of the linear slide 5 and the protective ring supporting column 6, and the linear slide 5 is connected to the protective ring supporting rod 4. The protective ring supporting rod 4 not only can play a role in supporting the user, but also can protect the safety of the user. A first pressure sensor 20 is arranged on the linear slide 5 to acquire pressure data in the protective ring supporting rod in real time when the user moves, and the data is fed back to the main control module 14 in the moving vertical rod module lattice 16, thus the VR exercise machine can correct the own movement state in time through data analysis. The protective ring supporting rod 4 is provided with a force-controlled sensor 21 and a damping inductor 22 which are both connected to the control machine. After the acquired pressure data is fed back to the control machine through the damping inductor 22 and the force-controlled sensor 21, the VR exercise machine can adjust the damping of the linear slide 5 in real time to guarantee the real experience feeling of the user in exercise and to ensure the safety of the user. Linear slides 5 may be used on all three protective ring supporting columns 6 as shown. In addition, more or fewer protective ring supporting columns 6 than shown in FIGS. 1 and 2.

Figure 3:
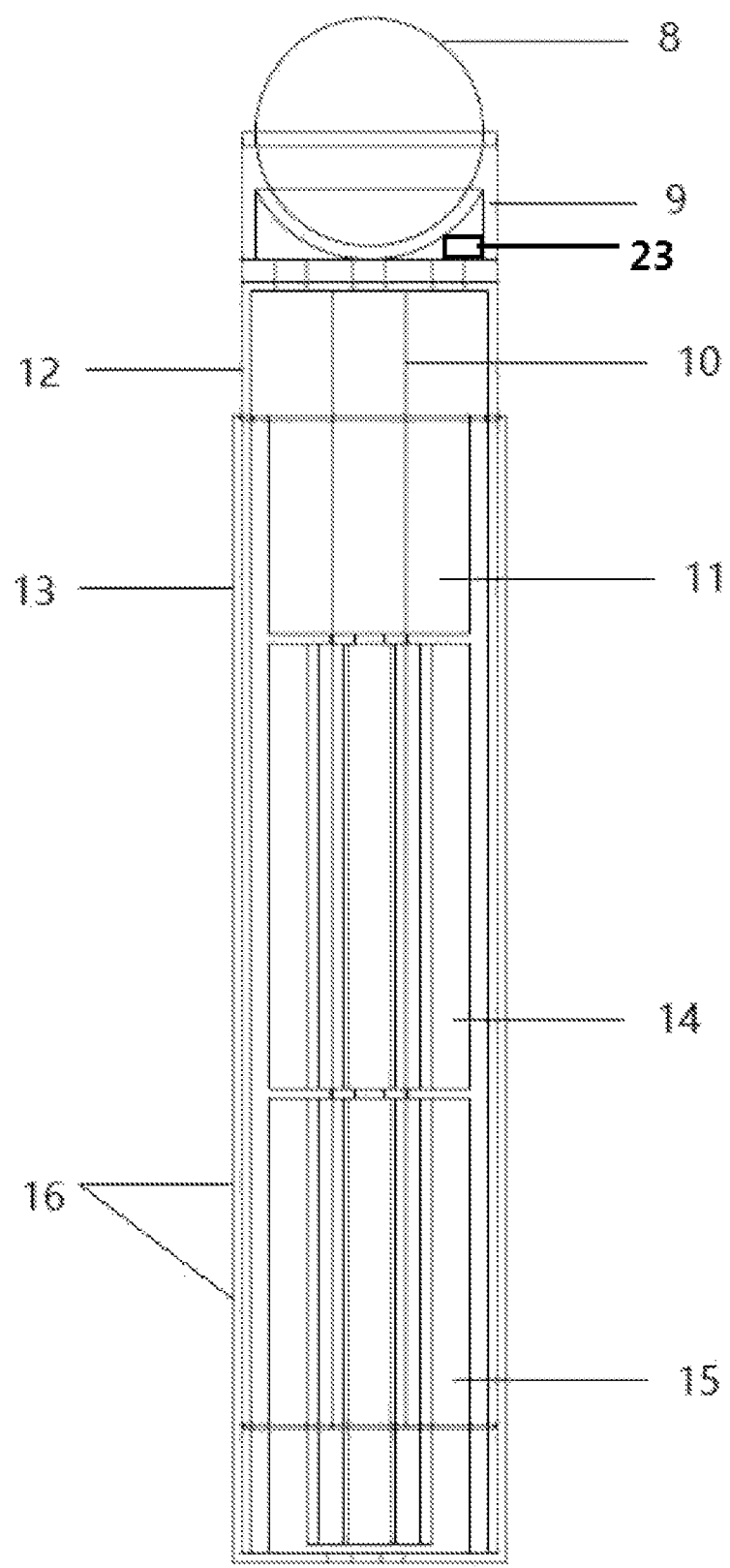
FIG. 3 is a structure diagram of a moving vertical rod module in the present disclosure.

As shown in FIG. 3, a structure diagram of a moving vertical rod module of the present disclosure is provided. Each moving vertical rod module in the moving vertical rod module lattice 16 comprises a small moving ball 8, an electromagnetic ring 9, a moving lead screw 10, a motor motion module 11, a movable sleeve 12, a supporting sleeve 13, a main control module 14, and a battery module 15. Movable sleeve 12 is nested in the supporting sleeve 13, while the battery module 15, the main control module 14 and the motor motion module 11 are sequentially connected to the interior of the supporting sleeve 13 from bottom to top. Moving lead screw 10 is arranged in the movable sleeve 12 and connected to the motor motion module 11, and the electromagnetic ring 9 is arranged above the moving sleeve 12. The motor motion module 11 in the present disclosure has the features of being fast in reaction speed and accurate in movement control; the moving lead screw 10 in the movable sleeve 12 is driven by the motion module 11 to move to drive the electromagnetic ring 9 to move up and down; the small moving ball 8 is embedded into the electromagnetic ring 9, and the electromagnetic ring 9 is connected to the main control module 14. The small moving ball 8 in the present disclosure is of a hollow structure, when the small moving ball 8 is in contact with the feet of the user, a magnetic force is provided by the electromagnetic ring 9, and the main control module 14 is used to control the magnetic force, thus controlling the contact condition of the small moving ball 8 and the feet of the user and simulating the terrain condition perceived by the user. A second pressure sensor 23 is arranged on the electromagnetic ring 9, and the small moving ball 8 above the electromagnetic ring 9 is to be in contact with the user directly. By arranging the second pressure sensor 23, the pressure data on the small moving ball 8 when the user moves can be acquired in real time, and then the pressure data is fed back to the main control module 14, thus the VR exercise machine can adjust the movement state in time according to data analysis.

The working process of the VR omni-directional exercise machine is specifically as follows: the user enters the exercise platform 7 and puts the protective ring 1 on the waist from top and fixes the inner protective net 3, and then the user can turn the body in any angle and simply walk in situ to adapt to the exercise platform 7. After finishing pre-exercise preparation, the VR omni-directional exercise machine is started, the user wears the VR head-mounted display 17 which may present real-time game graphics and a 3D-effect space, ground conditions including but not limited to level roads, mountain roads, grass, rocks, stairs, and the like. When the user moves in the virtual space, the VR omni-directional exercise machine can make corresponding changes along with the ground conditions in the virtual space. When the user enters a stair environment, the moving vertical rod module under the feet stays unchanged, the small moving ball 8 in the moving vertical rod module is also kept in a stable state through the magnetic force control of the electromagnetic ring 9, thus the small moving ball does not have sliding force. The moving vertical rod module in an advancing direction of the user moves upwards to simulate the stair environment, and when the moving vertical rod module rises, the small moving ball 8 in the moving vertical rod module is also kept in a stable state under the magnetic attraction of the electromagnetic ring 9 while the stability of the moving vertical rod module is guaranteed. Thus the small moving ball does not have the sliding force effect; when the user advances to the moving vertical rod module right ahead, the moving vertical rod module moves downwards to a horizontal plane of the exercise platform 7, the electromagnetic ring 9 below the small moving ball 8 no longer have the magnetic force effect, and the small moving ball 8 has the sliding force effect, thus completing the exercise in the advancing direction. Therefore, the movement unit of one stair is completed, and by repeating the movement unit, the user can achieve the exercise in the stair environment. When the user enters a level road environment, the moving vertical rod module no longer moves up and down, the user is only assisted by the small moving ball 8 to move on the level road, and the magnetic data is accurately controlled by the small moving ball 8 through the electromagnetic ring 9, thus guaranteeing that the user does not feel smooth or rough when doing exercise on the exercise platform.

The VR omni-directional exercise machine disclosed by the present disclosure solves the problem that an existing VR treadmill cannot simulate the ground environment in the virtual world, can achieve a series of exercise modes such as walking, running, jumping, crouching, stair climbing and the like in 360 degrees, and has the features of being safe, reliable, reasonable in structure, and high in science and technology feeling.

The above is only the preferred embodiment of the present disclosure, and the scope of protective of the present disclosure is not only limited to above embodiments, and all technical solutions belonging to the idea of the present disclosure belong to the scope of protective of the present disclosure. It should be noted that for those skilled in the art, various improvements and modifications without departing from the principles of the present disclosure should be deemed to be within the scope of protective of the present disclosure.

What is claimed is:

1. A virtual reality omni-directional exercise machine with a terrain environment simulation function, comprising:
   a protective ring,
   a protective ring supporting rod,
   a protective ring supporting column,
   an exercise platform,
   a control machine, and
   a virtual reality head-mounted display,
   wherein the protective ring is arranged above the exercise platform and is connected to the protective ring supporting column through the protective ring supporting rod, and the bottom of the protective ring supporting column is fixedly connected to an outer side of the exercise platform;
   the virtual reality omni-directional exercise machine further comprising a moving vertical rod module lattice arranged in the exercise platform, the moving vertical rod module lattice and the virtual reality head-mounted display are both connected to the control machine, and the control machine is used to coordinate and control the movement of the moving vertical rod module lattice according to a terrain environment displayed in the virtual reality head-mounted display;
   wherein each moving vertical rod module in the moving vertical rod module lattice comprises
   a small moving ball,
   an electromagnetic ring,
   a moving lead screw,
   a motor motion module,
   a movable sleeve,
   a supporting sleeve,
   a main control module and
   a battery module;
   wherein the movable sleeve is nested in the supporting sleeve: the battery module, the main control module and the motor motion module are sequentially connected to the interior of the supporting sleeve from bottom to top, the moving lead screw is arranged in the movable sleeve and connected to the motor motion module, the electromagnetic ring is arranged above the movable sleeve, the small moving ball is embedded in the electromagnetic ring, and the electromagnetic ring is connected to the main control module.

2. The virtual reality omni-directional exercise machine with the terrain environment simulation function according to claim 1, further comprising:
   a linear slide is arranged on a sidewall of the protective ring supporting column, and
   a first pressure sensor is arranged on a contact face of the linear slide;
   wherein the protective ring supporting column and the linear slide is connected to the protective ring supporting rod.

3. The virtual reality omni-directional exercise machine with the terrain environment simulation function according to claim 1, further comprising a force-controlled sensor and a damping inductor arranged on the protective ring supporting rod, and the force-controlled sensor and the damping inductor are both connected to the control machine.

4. The virtual reality omni-directional exercise machine with the terrain environment simulation function according to claim 1, wherein a second pressure sensor is arranged on the electromagnetic ring.

* * * * *